United States Patent

[11] 3,618,999

[72] Inventors Emil J. Hlinsky
Oakbrook;
Allen D. Siblik, Mundelein, both of Ill.
[21] Appl. No. 38,292
[22] Filed May 18, 1970
[45] Patented Nov. 9, 1971
[73] Assignee MacLean-Fogg Lock Nut Co.
Mundelein, Ill.

[54] CONVERTIBLE SECUREMENT APPARATUS FOR SECURING STANDARD CONTAINERS AND NONSTANDARD CARGO ON VEHICLES
17 Claims, 18 Drawing Figs.
[52] U.S. Cl..................................................... 296/35 A,
105/366 B, 105/368 T, 105/369 A, 248/119 R,
248/361 A, 280/179 A, 280/DIG. 8
[51] Int. Cl....................................................... B60p 7/08
[50] Field of Search........................................ 296/35 A;
280/179 R, 179 A, DIG. 8; 105/366 B, 368 T, 369
A; 248/119 R, 361 R, 361 A; 214/515; 294/81 SF

[56] References Cited
UNITED STATES PATENTS
3,374,008 3/1968 Blunden et al................ 280/179 A
3,439,822 4/1969 Korodi.......................... 280/DIG. 8
3,454,260 7/1969 Schwiebert et al............ 254/186

Primary Examiner—Benjamin Hersh
Assistant Examiner—Leslie J. Paperner
Attorney—Davis, Lucas, Brewer & Brugman ABSTRACT: Securement apparatus having a movable pedestal alternately usable either as a retractable twist lock or a chain tiedown winch. It is adapted to be used, for example, along the sides of vehicles such as flatbed trucks or railway flatcars, for releasably locking a standard container, or a nonstandard load such as a carton, a pallet or a machine packed for shipment. The device is movable along the side of the vehicle for use on a wide variety and combination of loads. The twist lock is elevatable above the level of the vehicle deck to secure standard containers, and is retractable below the deck level when a flatbed is required. It is readily movable for use at any selected position along the deck and is easily convertible for use as a chain tiedown for nonstandard cargo. When the twist lock is retracted, it frees space through which a tiedown chain can be trained and tensioned.

PATENTED NOV 9 1971  3,618,999

INVENTORS
Emil J. Hlinsky
Allen D. Siblik
BY
Davis, Lucas, Brewer & Brugman
ATTORNEYS INVENTORS
Emil J. Hlinsky
Allen D. Siblik
BY
Davis, Lucas, Brewer & Brugman
ATTORNEYS 3,618,999

CONVERTIBLE SECUREMENT APPARATUS FOR SECURING STANDARD CONTAINERS AND NONSTANDARD CARGO ON VEHICLES

BACKGROUND OF THE INVENTION

The field of this invention is generally a releasable lock and tiedown for loads on vehicles, of the class generally associated with Patent Office Classification No. 296.

The invention relates particularly to a combination twist lock and chain tiedown winch which is convertible to secure either standard containers or nonstandard cargo, or a combination of both.

It is customary to transport loads in closed containers which are of standard dimensions, for example, multiples of 10 ft. long, up to 40 ft. These are customarily transported on vehicles such as trailer units, which are 40 ft. long so that any combination of containers totaling 40 ft. long can be transported on a single trailer unit. These containers are releasably attached to outriggers of the bed or chassis of the trailer unit, or to edges of the trailer deck, by releasable locking means engaged with special, standardized corner castings or fittings, at the corner of each container. The containers are customarily loaded at the point of shipment for unloading at their ultimate destination without unloading them at any intermediate point. These containers have been standardized to such an extent that the same units may be mounted on railroad cars, ships, or trailers, so the load within a container can be shipped by these different kinds of carriers without disturbing the original packing.

Because a trailer unit must carry any combination of 10-, 20-, or 30-foot containers, or a single 40-foot container, each must have a sufficient number of locking devices to secure as many as four 10-foot containers. This requires eight special corner locks along each side of the deck to fasten the total of 16 corners on the four containers.

In addition to the standardized containers referred to above, much cargo is freight of nonstandard dimensions, such as crates, pallets of lumber, pipe assemblies, cylindrical objects, farm and industrial machinery, and miscellaneous objects of every size and shape. These cannot be fastened by the special locking devices provided for the standardized containers. Federal Highway Administration regulations require at least one tiedown device, such as a 16,200-pound test chain for each 10 feet of load length of cargo on a flatbed truck or trailer.

Conventional locking devices for standard containers often include locking elements which project at all times above the vehicle deck. These interfere with use of the vehicle for transporting nonstandard cargo which cannot be held by the conventional locking devices. Furthermore, the locking devices are often fixed at such locations that they cannot handle special or semistandard container lengths, such as 24 ft., 30 ft., and 35 ft. Conventional locking devices are not readily convertible to chain tiedown purposes. For this reason, a single set of standard container locking devices on a flat-deck truck or trailer cannot also be used to secure standard containers, or nonstandard cargo, or a combination thereof.

SUMMARY OF THE INVENTION

It is therefore a general object of the present invention to provide securement apparatus for the side of a vehicle deck, which is adjustable for use at various positions along the deck and is effective either to secure standard containers or nonstandard cargo.

In particular, it is an object of the invention to provide an anchor or pedestal member which is movable along a supporting guideway on the side of a vehicle, below the level of the deck, which pedestal has lock means engageable with the standard corner castings on such containers and which is convertible to function as a chain tiedown for nonstandard cargo.

In accordance with this invention, the securement apparatus includes an elongated, hollow channel guide fastened along a side of a vehicle deck and having a horizontal internal guideway within which an anchor or pedestal housing is movable along the length of the deck. Apertures are provided at intervals along the top flange of the channel guide. Twist lock means is carried by the housing and is movable through a selected one of the apertures to and from an elevated securement position for engagement with a corner casting of a standard container. When the twist lock means is retracted into the internal guideway, a chain winch carried by the housing is effective to tension a chain extending from nonstandard cargo, the chain being slidable across the top of the channel guide.

A specific object is the provision of such a channel guide with an external horizontal open side or slot, providing access to manually operable means for elevating and lowering the container locking means, for rotating the latter between locked and unlocked positions, and for locking the anchor housing against longitudinal movement along the channel guide.

BRIEF DESCRIPTION OF THE DRAWINGS

Other objects and advantages of the invention will be apparent from the following description taken in connection with the accompanying drawings in which.

DESCRIPTION OF THE PREFERRED EMBODIMENT

Figure 1:
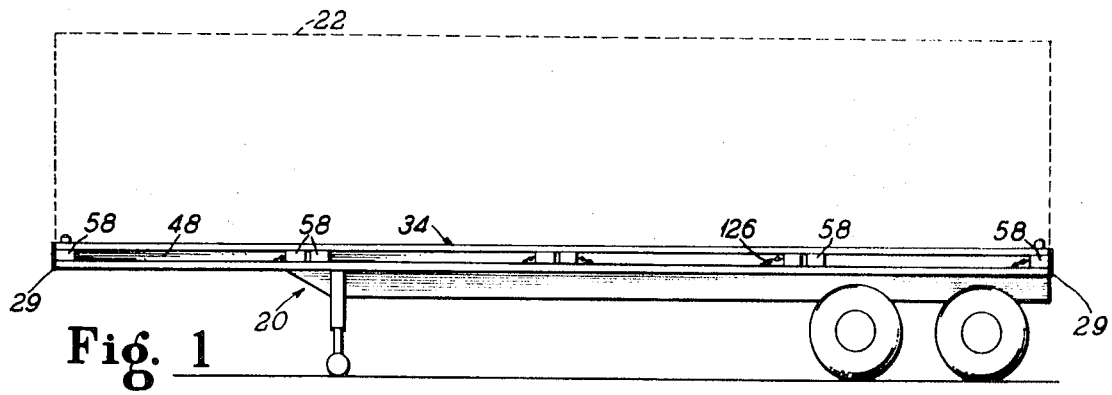
FIG. 1 is a schematic side elevation of a trailer unit carrying a single standard container (shown in broken lines) whose length equals that of the trailer unit.

Referring now to FIG. 1, a trailer unit 20 is illustrated having a length of 40 feet. A single elongated standard container 22, which also has a length of 40 feet, is carried by the bed or deck 24 of the trailer unit.

Figure 14:
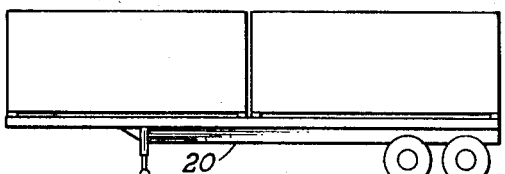
FIGS. 14 and 15 are similar to FIG. 1 but respectively showing the trailer unit fully loaded with two 20-ft. containers, and with a 20-ft. and two 10-ft. containers.
Figure 15:
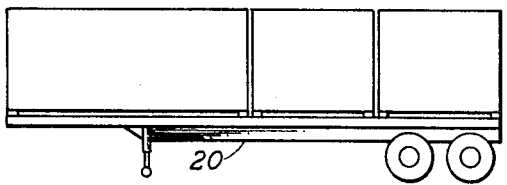

Any group of standard containers which have lengths in multiples of 10 feet may be secured in end-to-end relation up to a total length of 40 feet on the trailer unit. For example, in FIG. 14 the trailer unit carries two 20-ft. containers; and in FIG. 15 it carries one 20-ft. container and two 10-ft. containers.

Figure 3:
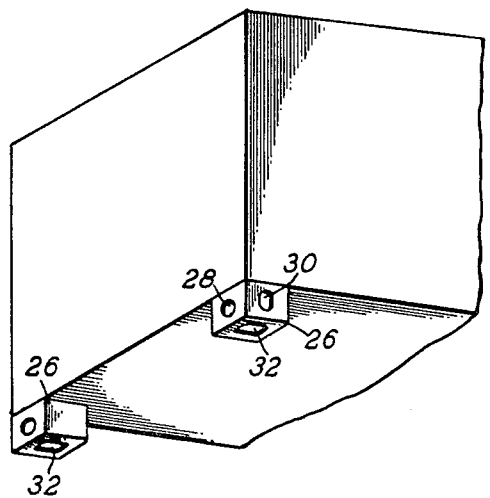
FIG. 3 is a fragmentary schematic perspective illustration of an end of a container.

All the standard containers have like construction at their ends, as shown in FIG. 3. At each lower corner is a hollow, cubical corner casting or fitting 26. Its bottom is provided with end and side openings 28, 30. These castings 26 have bottom slots 32 elongated lengthwise of the container and trailer unit. The shape, size, and placement of all four slots 32 comply with industry specifications for each special length of container. It is through these slots 32 that the locking T-heads and supporting pedestals pass for releasably locking the containers to the vehicle, as will now be described.

The securement apparatus comprises, along each side of the trailer bed, an elongated, hollow channel guide generally designated 34.

Figure 4:
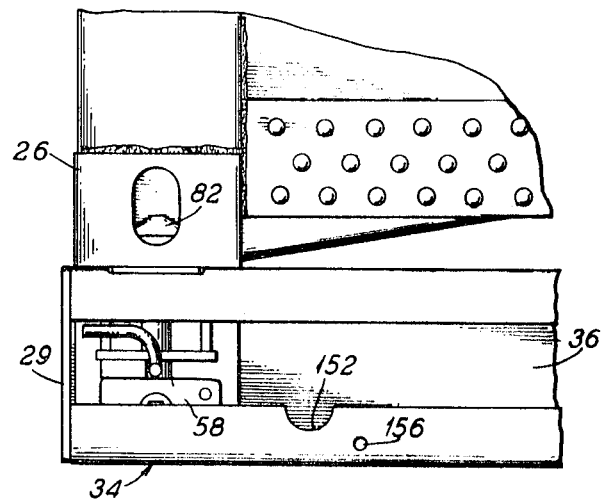
FIG. 4 is a fragmentary side view of one end of a container and the trailer unit, showing them locked together by the securement apparatus of the present invention.
Figure 5:
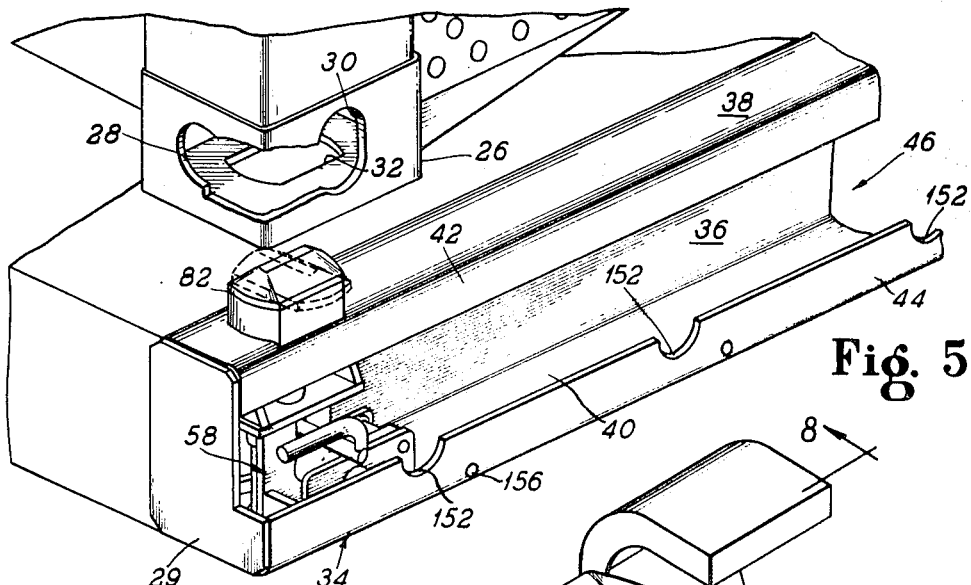
FIG. 5 is a fragmentary perspective exploded view of the corner arrangement shown in FIG. 4, with the rotary twist lock shown in both locked and unlocked conditions.
Figure 12:
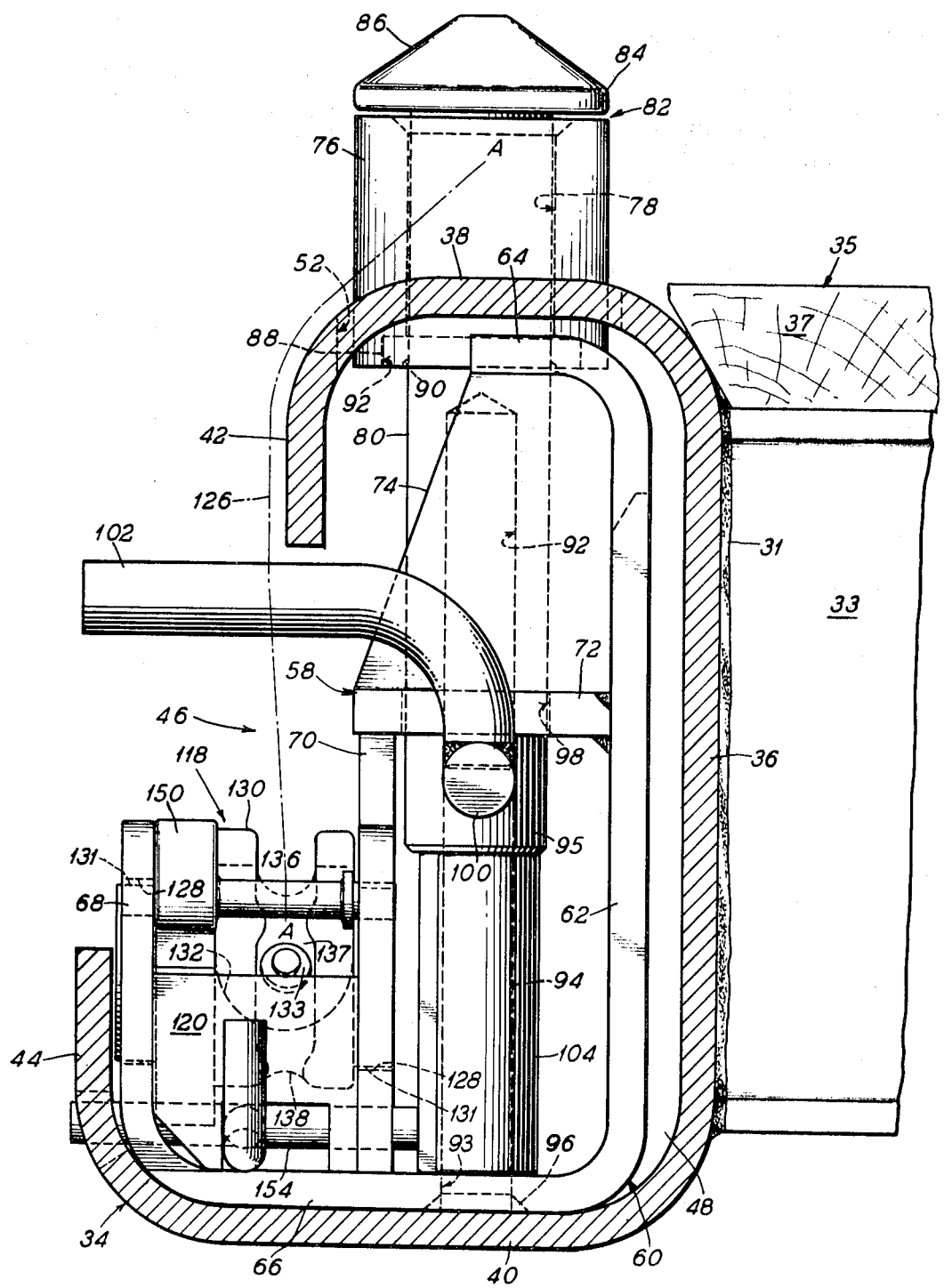
FIG. 12 is a vertical sectional view of FIG. 8 taken along the line 12—12.

Refer to FIGS. 4, 5 and 12 for the cross-sectional details of this special channel. A vertical web 36 is suitably fastened to each side of the trailer bed, as by welding at 31, to transverse I-beams 33 comprising the main cross structural members or bolsters for the deck 35. Planking 37 is provided in the usual manner for the cargo-carrying surface, to each side of the trailer bed. A top horizontal flange 38 extends outwardly from the top of the web. A bottom horizontal flange 40, somewhat wider than 38, extends outwardly from the bottom of the web. An upper vertical side flange 42 depends from the top flange and is spaced outwardly from the web. A lower vertical side flange 44 upstands from the bottom flange 40 and is spaced somewhat farther from the web to accommodate the winch which will be described below. There is a continuous horizontal access opening, or slot 46, between the upper and lower side flanges 42, 44, providing uninterrupted access to an internal guideway generally designated 48 and to the pedestals 58 which are slidable forward and backward therein as needed for the length of the particular load being secured on the deck, as will be described. Two end plates 29 (FIGS. 1, 4 and 5) retain the pedestals 58 in the guideway 48.

Figure 2:
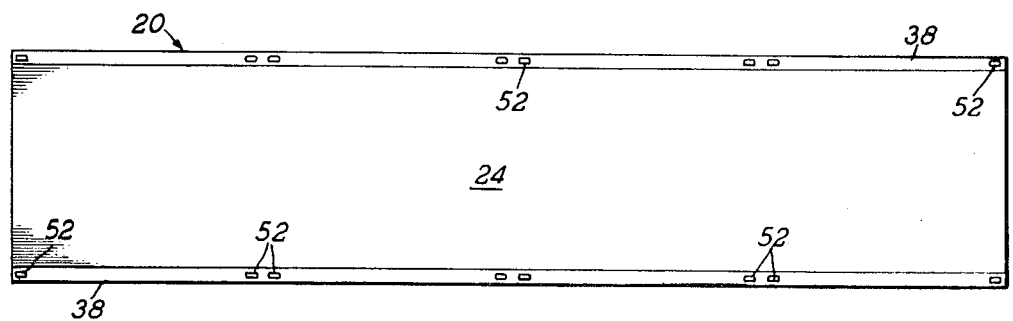
FIG. 2 is a schematic top view of the trailer unit of FIG. 1, with the container removed from it, FIG. 2 showing generally the arrangement of locking devices for a trailer unit which is adapted to secure combinations of standard containers up to 40 ft. long.

The top flange has a plurality of apertures 52. Specifically as shown in FIG. 2, eight of these apertures 52 are in each channel guide for the 40-ft. trailer unit shown.

Figure 6:
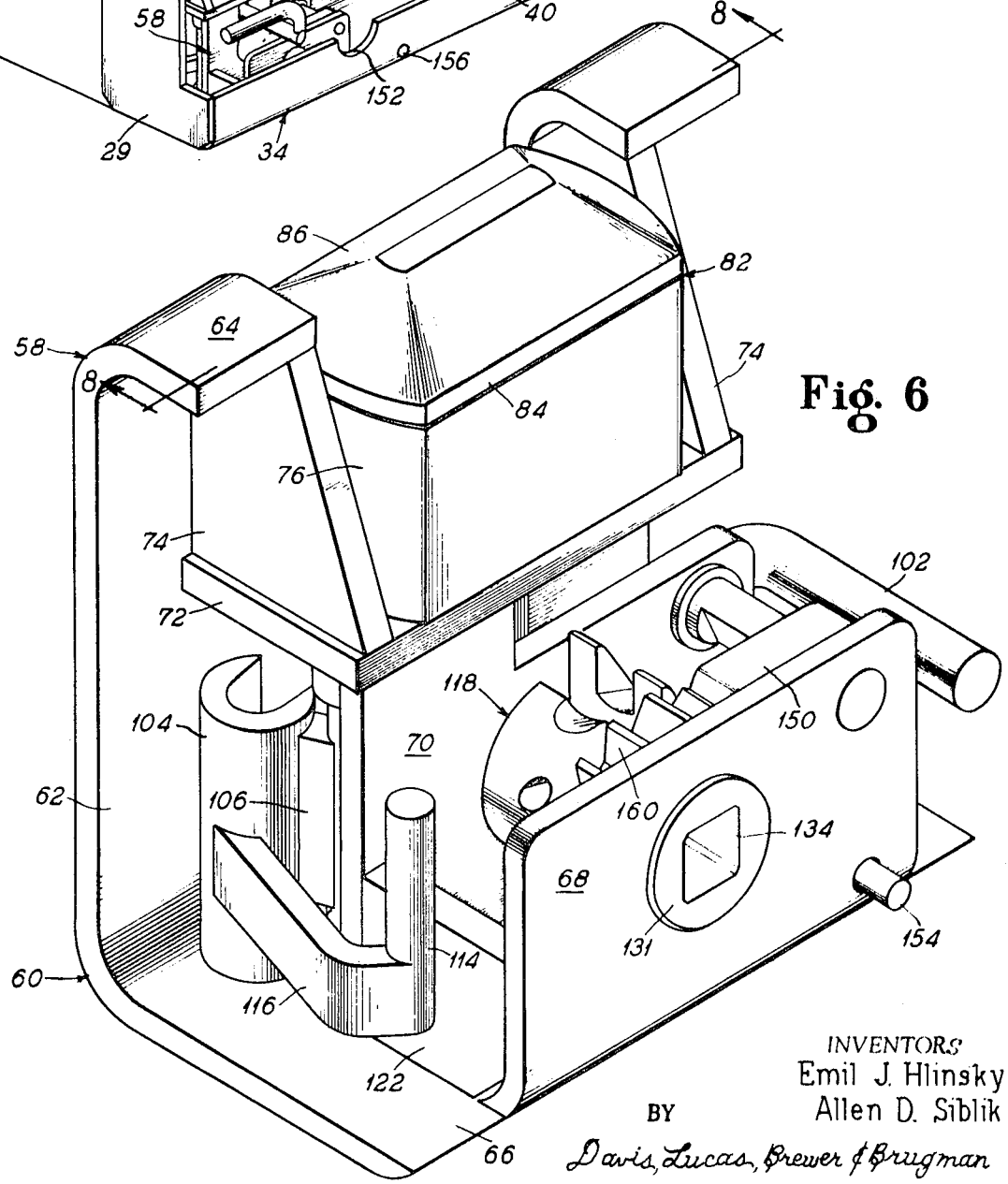
FIG. 6 is a perspective view of an anchor or pedestal member made in accordance with the present invention, showing it retracted and free to slide longitudinally along its channel guide.
Figure 7:
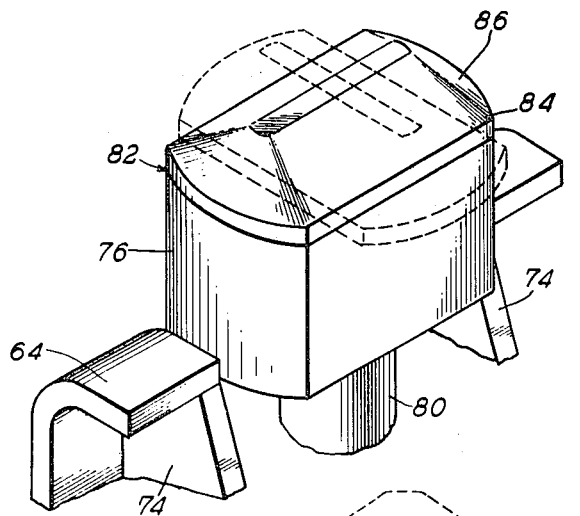
FIG. 7 is a fragmentary perspective view similar to FIG. 6 but showing the container locking means in elevated position, the broken line and solid line representations showing the T-head locking element rotated respectively to both locked and unlocked positions.

Each pedestal 58 (FIGS. 6 and 12) comprises a housing 60 comprising a vertical web 62, a short top horizontal flange 64, a longer bottom horizontal flange 66, and a lower vertical side flange 68 upstanding from the bottom flange or floor 66.

The pedestal or anchor housing 60 includes an intermediate wall 70 paralleling both web 62 and lower side flange 68. Welded to the top of the wall 70 and to the web 62, is a horizontal plate 72. Upstanding from the latter are two vertical reinforcing sidewalls 74, 74 which lend rigidity and strength to the housing assembly.

A bearing boss 76, having an elongated cross section generally similar to the casting slot 32 (FIGS. 3 and 5) is provided with an internal, preferably circular, vertical bore 78 within which is rotatably journaled a circular cross section shank or shaft 80 of a locking member generally designated 82. A T-head 84 with a pyramidal top surface 86 is fast atop the shank 80 and, like the bearing boss 76, has an elongated shape similar to the corner casting slot 32.

An annular collar 88 is fastened as by welding at 90 to the shank 80. It is seated in a counterbore 92 in the bearing boss 76, enabling the latter to be lifted and lowered with the shank.

The lower portion of the shank 80 is formed with a bore 92, providing the lower portion of the shank with a tubular cross section.

Upstanding from the bottom 66 of the pedestal housing is a guide rod 94 welded in place at 96. Thus, in addition to the fit of the bearing boss 76 in the aperture 52 and of the shank within the circular opening 98 in the plate 72, a major guiding and stabilizing factor is the telescopical sliding fit between the shank lower tubular portion 95 and the guide rod 94.

A transverse rod 100 is affixed as by welding to the lower portion of the shank 80 and is connected by a handle 102 which is accessible through the horizontal access slot 46 for lifting and lowering the T-head 84 with the boss 76, and for rotating the T-head 84 between locked and unlocked positions.

Figure 8:
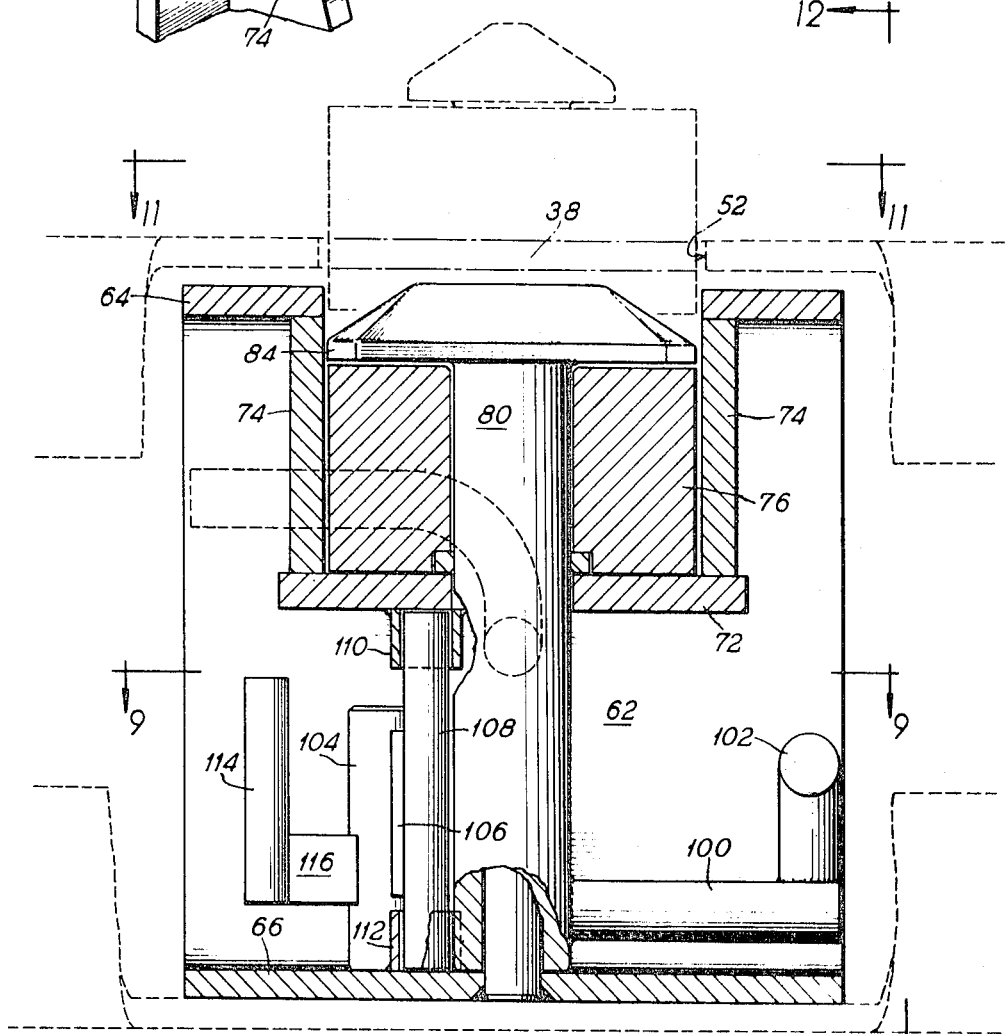
FIG. 8 is a vertical cross-sectional view of FIG. 6 taken along the line 8—8, the broken line and solid line representations showing the locking elements in elevated and retracted positions.

As best shown in the solid line position of FIG. 8, the bearing boss 76 and T-head 84 are retractable completely within the channel guide, below and clear of the top horizontal flange 38. By lifting handle 102, the shank 80, boss 76, and T-head 84 may be lifted straight up through one of the apertures 52. In this elevated position, it is desirable to lock the shank so it stays elevated while the container is maneuvered into position. For this purpose, a jack member or block 104 is provided. This is a vertical rod of sufficient length to fill the space between the bottom of the shank 80 and the floor plate 66 of the pedestal housing.

The jack member 104 is connected by a strut 106 to a vertical pivot shaft 108 journaled respectively in upper and lower sleeve bearings 110, 112. Bearing 110 is welded to the bottom plate 72 and bearing 112 is welded atop the plate 66. A manually operable handle 114 is connected by arm 116 to the jack member 104. The handle 114 is accessible through the access slot 46 at any position along the channel guide.

Figure 9:
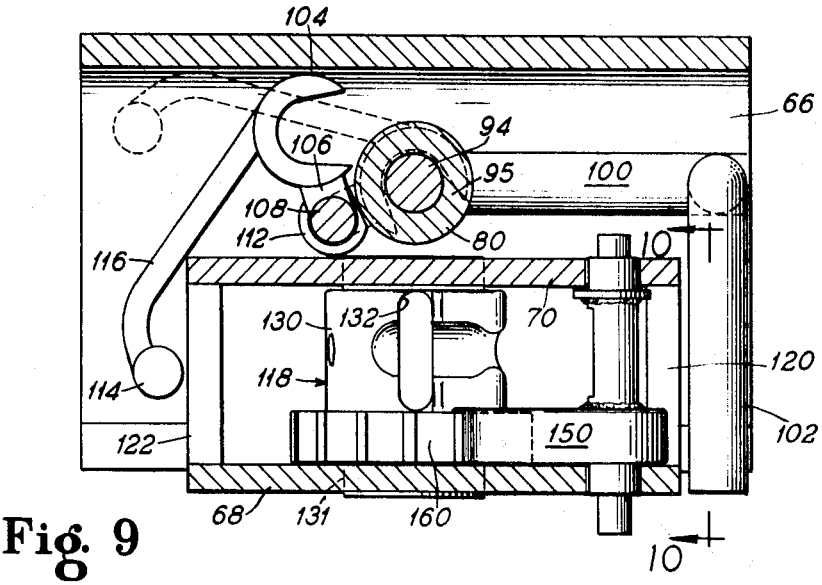
FIG. 9 is a horizontal sectional view taken along the line 9—9 of FIG. 8.

As shown in FIG. 9, the jack member 104 has a V-shaped cross section, enabling it to partially embrace and flank the guide rod 94 when it is pivoted into place beneath the shank 80.

A chain tiedown winch 118, for nonstandard cargo tiedown purposes, may be a unit similar to that shown in Schwiebert et al. U.S. Pat. No. 3,454,260, and will be briefly described as follows.

The winch 118 is flanked by two reinforcing sideplates 120, 122 which are welded between lower vertical side flange 68 and intermediate wall 70. A winch drum 130 is journaled for winding between flange 68 and wall 70, for example, by integral axle portions 131 extending into accommodating openings 128. The winch drum 130 includes a radial slot 132 therein, as well as a cross-bore 133. A socket 134 is provided in the exterior one of the axle portions 131 for coupling reception with a ratchet wrench or power tool. Guide grooves 136, 137, 138, etc., extend centrally around the periphery of the drum 130 and provide nesting reception for links of a chain 126 used to secure one of the loads, for example, in FIGS. 16–18.

The line of action A—A of the chain 126 is shown in FIG. 12. This passes from the winch drum, up, over and beyond the curved upper vertical end flange 42 of the channel guide.

Means for connecting the chain 126 to the drum 130 include a pin or bolt (not shown) extending through bore 133 and engaging the first chain link in the radial slot 132. A ratchet wheel 160, integral with the drum, and gravity-biased pawl 150, enable the chain to be tightened and held in taut condition to retain a load.

Use and operation of the convertible pedestal 58 will now be described, first for securement of a standard container by engagement of locking members 82 with the four corners of a standard container; and second, by winches 118 tensioning chains 126 to secure miscellaneous cargo.

As shown in FIG. 2, apertures 52 are spaced along the top horizontal flange 38, in positions to secure standard containers which are 10 feet, 20 feet, 30 feet, or 40 feet long. Additional apertures would be provided for other standard length but not so common, containers, such as 24 feet, 27 feet, or 35 feet long.

As shown in FIG. 1, eight pedestal units 58, together with their chains 126, are stowed within the guideway 48, for use with any combination of containers and cargo.

Figure 11:
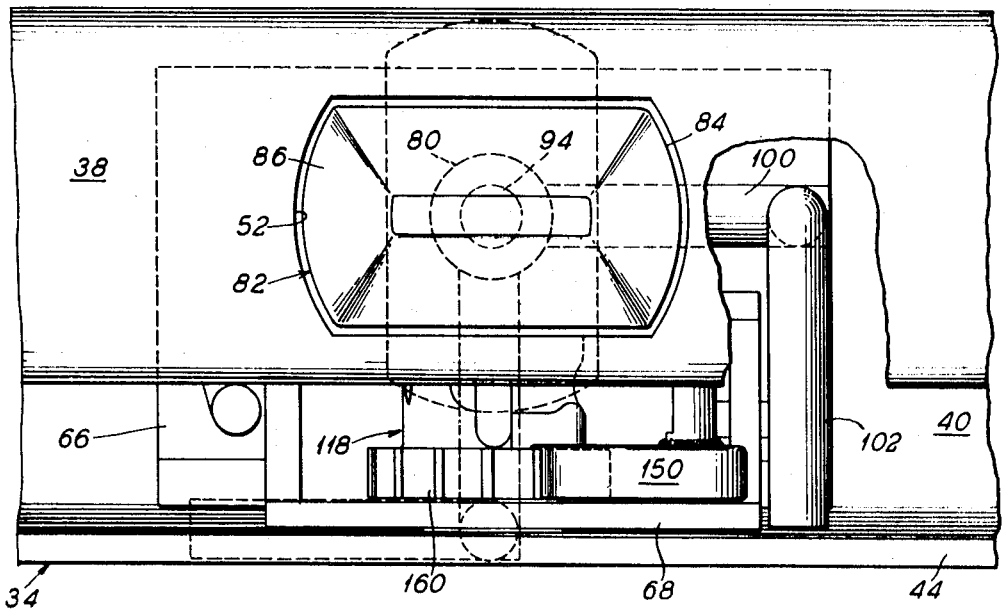
FIG. 11 is a top view of FIG. 8 taken in the direction of the arrows 11—11.
Figure 10:
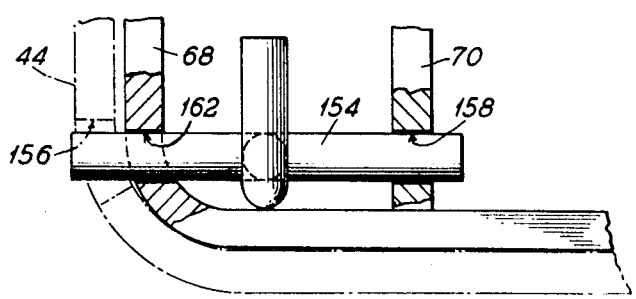
FIG. 10 is a fragmentary vertical sectional view of FIG. 9 taken along the line 10—10.

To secure a 40-foot container 22, the latching members 82 (that is, the boss 76, and head 84) at the four corners of the deck 24 will be elevated by lifting handle 102 and by then pushing handle 114 to slide the jack blocking member 104 beneath the shank 80. This holds the bearing boss 76 and T-head 84 in elevated position. The container is then lowered with its four corner castings seated over four bearing bosses 76 and four T-heads 84. By then swinging the handles 102 clockwise from the solid line to the broken line positions of FIG. 11, the four T-heads 84 will be swung to their transverse, locked position, one of which is shown in broken lines in FIG. 11.

The container is then securely mounted and locked in place and will so remain until the handles 102 are swung back to release the T-heads 84.

Now, referring to FIGS. 14, 16, 17 and 18, these show the pedestals 58 securing nonstandard cargo. To convert the pedestal to this condition, the handle 114 is moved to withdraw the jack member 104. Each handle 102 is then turned and lowered to retract the boss 76 and T-head 84 completely into the guideway 48. In this retracted position, the pyramid surface 86 is completely below and clearing the bottom surface of the top flange 38, thereby enabling the pedestal to be moved to any desired new position within the guideway 48.

Figure 13:
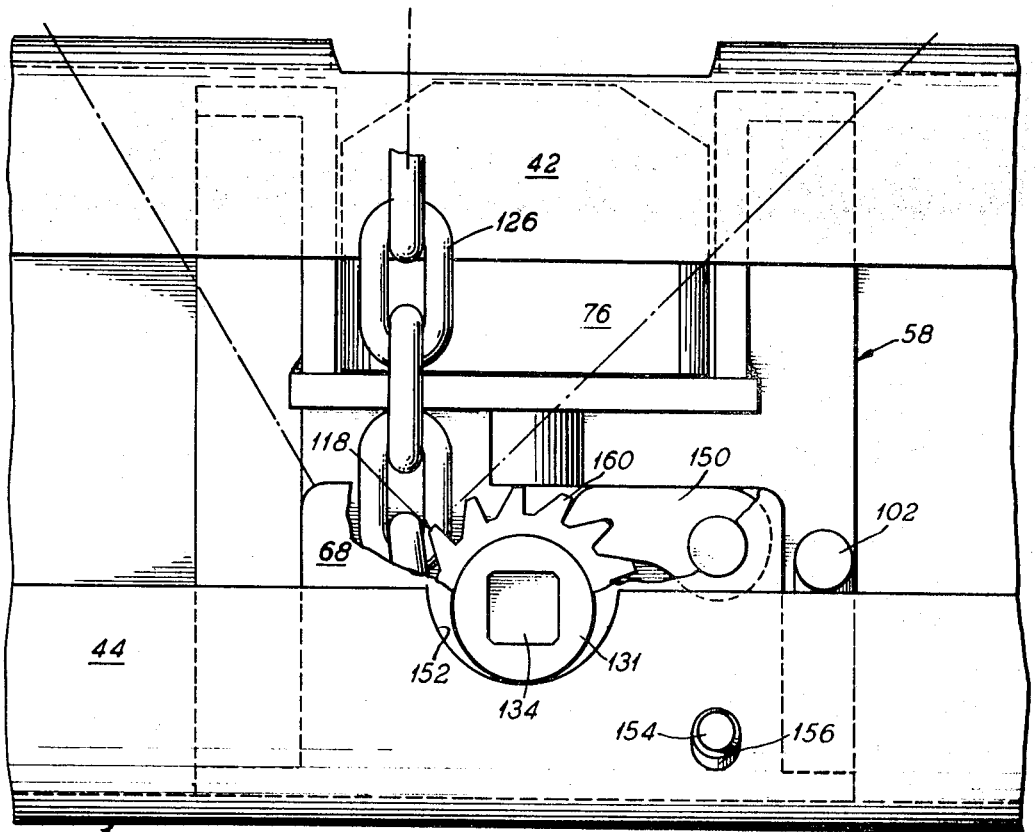
FIG. 13 is a side view of the channel guide and anchor member, illustrating its application to secure a tiedown chain for nonstandard cargo, the various lines of action of the chains being illustrated.
Figure 17:
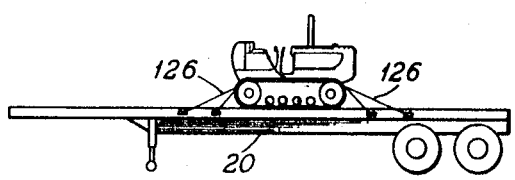
FIGS. 16, 17 and 18 are side views of the trailer unit of FIG. 1, with the securement apparatus converted to chain tiedown, as shown in FIG. 13, showing the securement of crates, a tractor, and a stack of pipes.
Figure 18:
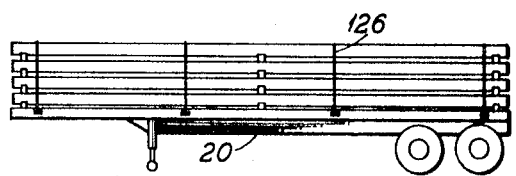
Figure 16:
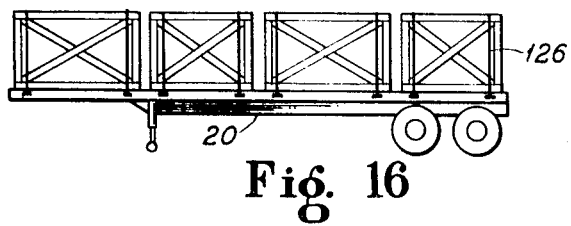

Note that the lower side flange 44 of the channel guide has several arcuate or semicircular notches 152. These may be about 1 foot apart. By moving the pedestal to a location where its socket 134 is registered with one of these notches, as shown in FIG. 13, the winch 118 can readily be operated by a ratchet tool inserted through the notch. By fastening a chain to eyes on the load as shown in FIG. 17, or passing the chain completely over the load as shown in FIGS. 16 and 18, it can then be drawn taut by the winch.

FIGS. 13, 16, 17 and 18 illustrate how the line of action of the chain 126 may extend straight up or angled to the right or to the left as a particular loading condition requires. To enable the chain 126 to secure a load and extend in any direction as required by the load, the channel guide 34 must present a perfectly smooth, preferably curved upper surface, over which it can be drawn and tightened, and the latch means 82 must be retracted completely out of the way, because many loading situations require the chain to pass directly through the area which would be occupied by the latch means 82 if it were elevated. The upper, vertical side flange 42 provides a smooth, continuous, curved guide flange over which the chain 126 can be trained and pulled straight. In effect, it acts as a bearing for the chain and helps it extend as close to a straight line as the attachment positions permit. As shown in FIG. 12, the winch 118 is substantially in the same vertical longitudinal plane as the upper bearing flange 42. This enables a substantially straight pull from the winch, over the surface 42 and onto the load.

To anchor the pedestal 58 against longitudinal movement along the guideway 48 when it is being used for chain securement, as just described, a latch rod 154 will be engaged with an abutment on the channel guide 34, this a abutment being one of the openings 156. There are several of these openings 156 along the lower, vertical side flange 44. These are positioned so the latch 154 will lock the pedestal in position for socket 134 to register with one of the openings 152. The latch rod 154 is journaled for in and out movement in openings 158 and 162 in plates 70 and 68, respectively. The latch is readily operated by the handle attached to it, accessible through the horizontal access slot 46.

By the present invention, a completely new system of securement has been provided in which one vehicle can handle all types of loads, including standard containers and nonstandard cargo. And an ordinary flatbed trailer may be readily adapted, by attachment of side channel guides 34 to these uses. A trailer used to carry a container load in one direction, may carry lumber or other nonstandard lading on the return, and thus never needs to double back empty.

An important feature of the system is the special, movable, and convertible, pedestal 58, having the unique winch takeup 118 built into it, thereby eliminating all load binder hardware which otherwise would have to be provided. The pedestals with latch means 82 and chains 126, with all necessary hooks and compression fittings, may readily be stored in the channel guideway 48 for immediate use when the particular load requires it.

Loads may be carried both ways on many more runs than is now possible with conventional equipment. A far better return is possible for the equipment investment. And a fleet of ordinary flat beds become a versatile fleet of container transporters as well. The securement system side channel guide 34 replaces, in many cases, a part of the existing structure in a trailer unit in a way which may actually increase strength and decrease deadweight.

The entire system is engineered for these advantages: Faster loading and unloading; more different kinds of loads than is possible with conventional equipment; and much safer transit. Stowage of load binder is so easy that it is almost automatic. On a typical trailer unit, eight pedestal-winch units 58 may be used in the manner described, or more, or less on each side, as is required by the use contemplated for the equipment.

An important part of the present invention, enabling it to function in the manner described, is the special elongated channel guide 34 of unique cross section. We claim as our invention:

We claim as our invention:

1. Convertible securement apparatus comprising
    an elongated, hollow channel guide adapted to be fastened along a side of a vehicle below the level of the vehicle deck to support standard containers or nonstandard cargo thereon, the channel guide having a horizontal internal guideway;
    the channel guide having a top flange with a plurality of apertures spaced along the length thereof;
    a pedestal housing within the channel guide and movable along the internal guideway;
    lock means carried by the pedestal housing;
    the housing being movable along the internal guideway to a plurality of positions in which the lock means is successively vertically aligned with the apertures;
    the lock means being movable through each aperture, when aligned therewith, to and from an elevated securement position above the top flange, and having a head which is movable to and from a locked position to engage a standard container corner casting when in said elevated securement position;
    manually operable means carried by the pedestal housing for moving the lock means to and from its elevated securement position, and for moving the head to and from its locked position
    winch means being rotatably journaled in the housing and being effective to tension flexible element trained across the top flange and extending between the winch means and cargo on the deck;
    said lock means and said winch means being alternatively effective to secure a standard container or nonstandard cargo on the deck; and
    said channel guide being effective to store flexible elements in said guideway when not in use to secure cargo.

2. Convertible securement apparatus according to claim 1 having a jack block in said pedestal housing and means in said housing for moving said block to and from a jacking position beneath said lock means when the latter is in its elevated securement position.

3. Convertible securement apparatus comprising an elongated, hollow channel guide adapted to be fastened along a side of a vehicle bed and below the level of the vehicle deck to support standard containers or nonstandard cargo thereon, the channel guide having a horizontal internal guideway accessible through a horizontally elongated slot;

the channel guide having a top flange with a plurality of apertures spaced along the length thereof, and an external, horizontally elongated bearing rail at a level above the slot to provide a sliding bearing support for flexible element along the channel guide;

a pedestal housing within the channel guide and movable along the internal guideway;

twist lock means carried by the pedestal housing and comprising a nonrotatable boss and a rotatable head, both being sized and shaped to fit a standard container corner lock opening; the pedestal housing being accessible through said horizontally elongated slot for movement along the internal guideway to a plurality of positions in which said twist lock means is successively, vertically aligned with said apertures;

manually operable means accessible through said horizontally elongated slot and effective to move said boss and head concurrently through each aperture, when aligned therewith, to and from an elevated securement position above the top flange, said manually operable means further being effective, when the boss and head are in their elevated securement position, to rotate the head independent of the boss to and from a position to lock a standard container corner seated on the top flange about the boss;

winch means being rotatably journaled in the housing at a level below said bearing rail and being effective to tension a flexible element trained across said bearing rail and through said horizontal slot and extending between the winch means and cargo on the deck;

said twist lock means and said winch means being alternatively, effective to secure a standard container or nonstandard cargo on the deck; and said channel guide being effective to store flexible elements in said guideway when not in use to secure cargo.

4. Convertible securement apparatus according to claim 3 having a jack member in said pedestal housing and means in said housing for moving said jack member to and from a position beneath the twist lock means to support said boss and head when in their elevated securement position.

5. Convertible securement apparatus comprising an elongated, hollow channel guide adapted to be fastened along a side of a vehicle deck to support containers and cargo thereon, the channel guide having a horizontal, internal guideway accessible through an elongated, horizontal side slot;

said channel guide having a top flange with a plurality of apertures spaced along the length thereof;

a pedestal member having a housing movable along the internal guideway;

elevatable twist lock means carried by the pedestal member housing and being successively registrable with said apertures on movement of said housing, the twist lock means comprising a bearing boss supported for vertical movement by said housing, a rotatable shank journaled in the bearing boss for rotation about a vertical axis, said shank having a T-head at the top of the bearing boss, both said bearing boss and head being shaped and sized for vertical movement through said apertures;

means for lifting and lowering said bearing boss and T-head to provide operating positions as follows an upper, extended position with the bearing boss extending through one of the apertures and the T-head elevated above the top flange to engage a container corner casting, and a lower, retracted position with the head and boss below the top flange to enable the pedestal member housing to be moved along the internal guideway;

means for rotating said T-head when in its upper, extended position to engage and disengage a container;

a winch for a flexible element rotatably journaled in said housing and accessible through said horizontal side slot and effective to tension a chain extending between the winch and cargo on the deck;

said twist lock means and said winch being alternately effective to secure a standard container or nonstandard cargo on the deck;

said channel guide being effective to store flexible elements in said internal guideway when not in use to secure cargo; and means for holding the pedestal member housing against movement along the internal guideway when the winch is tightened.

6. Convertible securement apparatus according to claim 5, in which the means for lifting and lowering the bearing boss and T-head includes handle means accessible through the horizontal slot and connected to the shank and elevatable to lift the bearing boss and shank from their lower to their upper positions, and said handle means is swingable when the bearing boss and shank are in their upper positions to rotate said T-head from positions to engage and disengage a container.

7. Convertible securement apparatus according to claim 5, in which the shank is guided for vertical movement by a slidable connection between the lower end of the shank and a vertical guide fixed to the housing.

8. Convertible securement apparatus according to claim 5, in which the lower end of the shank is guided for vertical movement by a telescopical connection with a fixed vertical element upstanding from a bottom interior surface of the housing.

9. Convertible securement apparatus according to claim 5, in which the lower end of the shank is a tube and is guided for vertical movement by a telescopical sliding connection with an axial rod upstanding from the bottom of the housing.

10. Convertible securement apparatus according to claim 5, in which the shank is a tube telescopically slidable on an upstanding guide rod fixed to the bottom of the housing, and an open-sided jack block is movable to and from a position beneath the shank and partially embraces the rod to support the head in its upper extended position.

11. Convertible securement apparatus according to claim 5, in which the means for holding the pedestal member housing a against longitudinal movement relative to the channel guide is a latch carried by the housing, and a series of abutments engageable by the latch along the channel guide, and manually operable means for engaging the latch with one of said abutments being accessible through the horizontal side slot.

12. Convertible securement apparatus according to claim 5, having a jack block within said housing and movable to and from a position beneath the shank to support the head in its upper extended position.

13. Convertible securement apparatus according to claim 12, in which the jack block has a manually operable handle accessible through the horizontal side slot of the channel guide.

14. Convertible securement apparatus according to claim 13, in which the jack block is carried by an arm which is pivoted to the housing about a vertical axis.

15. Convertible securement apparatus comprising an elongated, hollow channel guide adapted to be fastened along a side of a vehicle below the level of the vehicle deck to support standard containers or nonstandard cargo thereon, the channel guide having a horizontal internal guideway accessible through a horizontally elongated slot;

the channel guide having a top flange with a plurality of apertures spaced along the length thereof;

a pedestal housing within the channel guide and movable along the internal guideway and accessible through said slot;

twist lock means carried by the pedestal housing;

the housing being movable along the internal guideway to a plurality of positions in which the twist lock means is successively vertically aligned with the apertures;

the twist lock means being movable through each aperture, when aligned therewith, to and from an elevated securement position above the top flange, and having a head which is rotatable to and from a locked position to engage a standard container corner casting when in said elevated securement position;

manually operable means carried by the pedestal housing for moving the twist lock means to and from its elevated securement position, and for rotating the head to and from its locked position;

winch means being rotatably journaled in the housing and being effective to tension flexible element trained across the top flange and extending between the winch means and cargo on the deck;

said twist lock means and said means being alternatively effective to secure a standard container or nonstandard cargo on the deck; and said channel guide being effective to store flexible elements in said guideway when not in use to secure cargo.

16. In convertible securement apparatus for the side of a vehicle bed, an elongated channel guide for a container and cargo-supporting pedestal, said channel guide having a cross section comprising a vertical web attachable to the side of the bed;

a pedestal carrying a winch and a locking member;

top and bottom horizontal flanges extending in the same direction from said web and bed when attached thereto, the top flange having a plurality of apertures for the extension of said locking member at selected positions along the channel guide, the bottom horizontal flange being wider than the top horizontal flange for supporting said pedestal;

said bottom horizontal flange having an upstanding marginal side flange;

said top horizontal flange having a dependable marginal side flange;

said upstanding and depending marginal side flanges defining a continuous horizontally extending access slot therebetween;

said web, top and bottom horizontal flanges, and marginal side flanges defining an internal guideway for a supporting pedestal within said channel guide, accessible through said slot.

17. In convertible securement apparatus, the combination of claim 16 in which a supporting pedestal is slidable along said internal guideway, and having said winch member continuously accessible through said access slot to an external flexible tiedown element.

* * * * *